United States Patent
Bakke et al.

(10) Patent No.: US 6,779,077 B1
(45) Date of Patent: Aug. 17, 2004

(54) VIRTUAL TAPE LIBRARIES

(75) Inventors: Mark A. Bakke, Maple Grove, MN (US); Timothy J. Kuik, Lino Lakes, MN (US); Anthony W. Steere, Jr., Superior, CO (US); Renae M. Weber, Minneapolis, MN (US)

(73) Assignee: Storage Technology Corporation, Louisville, CO (US)

( * ) Notice: Subject to any disclaimer, the term of this patent is extended or adjusted under 35 U.S.C. 154(b) by 237 days.

(21) Appl. No.: 09/688,776

(22) Filed: Oct. 16, 2000

Related U.S. Application Data (63) Continuation-in-part of application No. 09/400,500, filed on Sep. 21, 1999.

(51) Int. Cl.[7] .................................. G06F 12/00
(52) U.S. Cl. ...................... 711/111; 711/202
(58) Field of Search .................. 711/4, 111, 112, 711/114, 201, 202; 700/214; 360/91; 369/30.01, 30.38, 30.39, 30.4, 30.41, 30.46, 30.48, 30.54, 34.01

(56) References Cited

U.S. PATENT DOCUMENTS

| | | |
|---|---|---|
| 4,945,429 A | 7/1990 | Munro et al. |
| 5,214,768 A | 5/1993 | Martin et al. |
| 5,303,214 A | 4/1994 | Kulakowski et al. |
| 5,388,260 A | 2/1995 | Monahan et al. |
| 5,412,791 A | 5/1995 | Martin et al. |
| 5,430,855 A | 7/1995 | Walsh et al. |
| 5,475,817 A | 12/1995 | Waldo et al. |
| 5,504,873 A | 4/1996 | Martin et al. |
| 5,506,986 A | 4/1996 | Healy |
| 5,535,322 A | 7/1996 | Hecht |
| 5,537,585 A | 7/1996 | Blickenstaff |
| 5,546,557 A | 8/1996 | Allen et al. |
| 5,560,040 A | 9/1996 | Mizumachi |
| 5,566,331 A | 10/1996 | Irwin, Jr. et al. |
| 5,613,154 A | 3/1997 | Burke et al. |
| 5,630,067 A | 5/1997 | Kindell et al. |
| 5,640,510 A | 6/1997 | Hanaoka et al. |
| 5,664,186 A | 9/1997 | Bennett et al. |
| 5,671,439 A | 9/1997 | Klein et al. |
| 5,689,481 A | 11/1997 | Tamura et al. |
| 5,694,550 A | 12/1997 | Takeda et al |
| 5,710,549 A | 1/1998 | Horst et al. |
| 5,740,362 A | 4/1998 | Buickel et al. |
| 5,751,715 A | 5/1998 | Chan et al. |
| 5,758,050 A | 5/1998 | Brady et al. |
| 5,758,085 A | 5/1998 | Kouoheris et al. |
| 5,758,125 A | 5/1998 | Misinai et al. . |

(List continued on next page.)

FOREIGN PATENT DOCUMENTS

| | | |
|---|---|---|
| EP | 0 535 922 A2 | 4/1993 |
| WO | WO 98/33113 | 7/1998 |
| WO | WO 98/40810 | 9/1998 |
| WO | WO 00 04454 A | 1/2000 |

OTHER PUBLICATIONS

"Method For Inserting Stacked Volumes For Import Into A Virtual Tape Server Library", IBM Technical Disclosure Bulletin, Issue 430, p. 376, Feb. 2000.*

(List continued on next page.)

Primary Examiner—Pierre Bataille
(74) Attorney, Agent, or Firm—Brooks Kushman P.C.

(57) ABSTRACT

Virtual tape libraries are accessed by computer elements such as host computers. A canonical tape module services each tape drive. Each computer element is provided access to at least one logical tape module. Each logical tape module is mapped to a canonical tape module in response to a request to access a tape volume. Thus, each computer element has a logical tape drive capable of accessing any volume on any cartridge in any tape library within the storage system.

22 Claims, 5 Drawing Sheets

U.S. PATENT DOCUMENTS

| | | | |
|---|---|---|---|
| 5,802,258 | A | 9/1998 | Chen |
| 5,805,864 | A | 9/1998 | Carlson et al. |
| 5,809,285 | A | 9/1998 | Hilland |
| 5,828,836 | A | 10/1998 | Westwick et al. |
| 5,829,053 | A | 10/1998 | Smith et al. |
| 5,832,527 | A | 11/1998 | Kawaguchi |
| 5,838,891 | A | 11/1998 | Mizuno et al. |
| 5,881,311 | A | 3/1999 | Woods |
| 5,884,046 | A | 3/1999 | Antonov |
| 5,890,203 | A | 3/1999 | Aoki |
| 5,941,972 | A | 8/1999 | Hoese et al. |
| 5,963,971 | A | 10/1999 | Fosler et al. |
| 6,029,230 | A * | 2/2000 | Ng ............................ 711/158 |
| 6,031,798 | A * | 2/2000 | James et al. ................ 711/111 |
| 6,044,442 | A * | 3/2000 | Jesionowski ................ 711/153 |
| 6,052,341 | A * | 4/2000 | Bingham et al. ........... 711/112 |
| 6,067,481 | A * | 5/2000 | Saliba et al. ................ 700/214 |
| 6,094,605 | A * | 7/2000 | Blendermann et al. ..... 711/111 |
| 6,247,096 | B1 * | 6/2001 | Fisher et al. ................ 711/114 |
| 6,260,006 | B1 * | 7/2001 | Wong et al. ................. 711/111 |
| 6,324,497 | B1 * | 11/2001 | Yates et al. ................... 703/24 |
| 6,336,163 | B1 * | 1/2002 | Brewer et al. .............. 711/111 |

OTHER PUBLICATIONS

"A Distributed Persistent Object Store For Scalable Service", Jin et al, Institute of High Performance Computing technology, ACM Computing Survey, pp. 36–49, 1999.*

"Cluster–Based Scalable Network Services", Armando Fox et al., University of California at Berkeley, ACM Computing Survey pp. 78–91, 1997.*

J.L. Sloan et al., "MaSSIVE™: The Mass Storage System IV Enterprise" Proceedings of the IEEE, vol. 81, No. 4, Apr. 1993, pp. 621–630.

S. Coleman et al. "Mass Storage system Reference Model" Version 4"Published by the IEEE Technical Committee on Mass Storage Systems and Technology, May 1990, pp. 1–39.

Jander, M. "Launching Storage–Area Net", Data Communications, US, McGraw Hill, New York, vol. 27, No. 4, Mar. 21, 1998, pp. 64–72.

Christensen, B. "Building a Storage–Area Network–SANS Boost Performance, Reliability and Scalability of the Critical Link Between servers and Storage Devices, " Data Communications, US, McGraw Hill, New York, vol. 27, No. 6, Apr. 21, 1998, pp. 67–70 & 74.

* cited by examiner

VIRTUAL TAPE LIBRARIES

This application is a continuation-in-part of application Ser. No. 09/400,500 filed Sep. 21, 1999.

TECHNICAL FIELD

The present invention relates to accessing and controlling tape libraries for computer systems.

BACKGROUND ART

Tape libraries provide an effective and economical means for storing large amounts of information. Each tape library includes one or more tape drives performing access operations such as writing to tape and reading from tape. Information stored on magnetic tape is logically broken into tape volumes. The magnetic tape is typically packaged in tape cassettes or cartridges. There may be a one-to-one correspondence between tape volumes and cartridges, there may be multiple volumes on a single cartridge, or one volume may be split between several tape cartridges. In order to access information in a particular tape volume, the tape cartridge containing that volume must be loaded into a tape drive. In automated tape libraries, this is accomplished through a loading mechanism such as a robot. Larger information processing systems may contain more than one tape library. Cartridges may be passed between tape libraries manually or through the use of automated transport equipment. Tape volumes may be taken out of tape libraries manually through portals or may be copied onto a tape cartridge outside the tape library. Tape libraries are typically controlled by a tape library server which may perform functions such as tracking which cassettes hold each tape volume, tracking which library holds each cassette, controlling cassette loading and unloading mechanisms, controlling inter-library transport mechanisms, tracking cartridge use, managing data archiving, and the like.

Typically, tape libraries and the library server are directly connected to one or more host computers requiring access to tape volumes held within the tape libraries. Each host is connected to one or more tape drives through data links or tape channels. Each host is also connected to the library server. When a host computer wishes to access a particular tape volume, the host sends an access request for that volume to the library server. The library server determines if the requested volume is on a cassette within a tape library containing a tape drive connected to the requesting host. If not, the library server flags an operator or controls robots and transport mechanisms to move the tape cartridge to an appropriate tape library. The library server then commands a tape loading mechanism to mount the cartridge containing the requested volume into the host computer tape drive. The host computer can then write data to or read data from the mounted volume. When the host is through accessing the volume, the library server dismounts the cartridge.

There are many problems associated with the traditional connection of host computers to a tape library system. First, traditional systems lack flexibility. Adding additional storage resources, such as tape libraries and drives, requires running tape links between the new resources and host computers. The additional resources may further require software changes in the host computers to accommodate the increase in number and, possibly, differing types of storage. A second problem with traditional storage system configurations is the lack of complete connectivity between host computers and tape drives. If a particular volume requested by a host is located in a tape library to which the host does not have direct access, the host must wait for the relatively long period of time required to transfer the cassette containing the requested volume into a tape library to which the host has access. In addition to creating potentially long delays, the incomplete connectivity between hosts and libraries may result in underutilization of tape drives. A tape drive not being used by any host to which it is directly connected cannot be assigned to a different host. Another connectivity concern is library system equipment failure. If a tape drive or cassette loading mechanism fails, the tape system cannot be easily modified to offer uniform degraded performance to all host computers.

DISCLOSURE OF INVENTION

The present invention provides virtual tape libraries that may be accessed by computer elements such as host computers. Each computer element is provided access to at least one logical tape module. Each logical tape module appears to the computer element as a tape drive capable of accessing any volume on any cartridge in any tape library within the storage system.

A system implementing virtual tape libraries accessible by at least one host computer is provided. Each host computer has at least one computer link for writing data to and reading data from storage. The system includes at least one tape library for accessing tapes. Each tape library has at least one tape link carrying data written to or read from the tapes. A library server generates tape access commands for each tape library. A storage area network interfaces the host computers, tape libraries, and the library server. The storage area network maps logical tape access requests from each host computer into physical tape access requests for each tape library and the library server.

In an embodiment of the present invention, the storage area network includes at least one logical tape module for each host computer. Each logical tape module receives requests to access data on a tape volume. Each tape library is associated with at least one canonical tape module. Each canonical tape module responds to requests to access data on the tape volume. A management processor maps each logical tape module to a canonical tape module capable of responding to the tape volume access requests.

In another embodiment of the present invention, the management processor includes a proxy library having routines for servicing tape access requests. A client-side interface executes tape access request service routines based on tape access requests received from the host computers. A server-side interface generates library server commands based on the results of executed tape access request service routines. The client-side interface may exchange information with host computers through a first set of commands and the server-side interface may exchange information with the library server through a second set of commands.

A storage area network implementing virtual tape libraries is also provided. The storage area network includes logical tape modules. Each logical tape module presents a logical tape drive to a computer element communicating with the logical tape module. The storage area network also includes canonical tape modules. Each canonical tape module communicates with a physical tape drive. A data interconnect connects the logical tape modules with the canonical tape modules. A management processor maps each logical tape module requested by a computer element into at least one canonical tape module.

A method of accessing data stored on magnetic tape is also provided. A request to access a tape volume is received.

A tape drive that may satisfy the tape access request is determined. The tape drive is reserved in a canonical tape module. Each request to access data on the tape volume is mapped to the canonical tape module in a logical tape module. Each mapped data access request is forwarded from the logical tape module to the canonical tape module.

In an embodiment of the present invention, a request to access the tape volume begins by receiving a request to mount the tape volume. A mount query is sent to a tape library server. The mount query response is received from the tape library server. A plurality of canonical tape module identifiers may be received in the mount query response, each canonical tape module identifier identifying a tape drive capable of satisfying the tape access request. One canonical tape module identifier is selected from the plurality of canonical tape module identifiers corresponding to the tape drive optimizing the tape access request.

In another embodiment of the present invention, reserving the tape drive includes receiving a request to reserve the tape drive in the canonical tape module. A request to reserve the tape drive is sent to a tape library containing the tape drive. A response indicating that the tape drive has been reserved is received and sent to a management processor.

A method of presenting virtual tape libraries to at least one host computer is also provided. Each host computer is connected to at least one logical tape module. Each tape library is connected to at least one canonical tape module. A request to access a tape volume is received from the host computer. The request specifies a logical tape module. The specified logical tape module is mapped to a canonical tape module which can access the requested tape volume.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
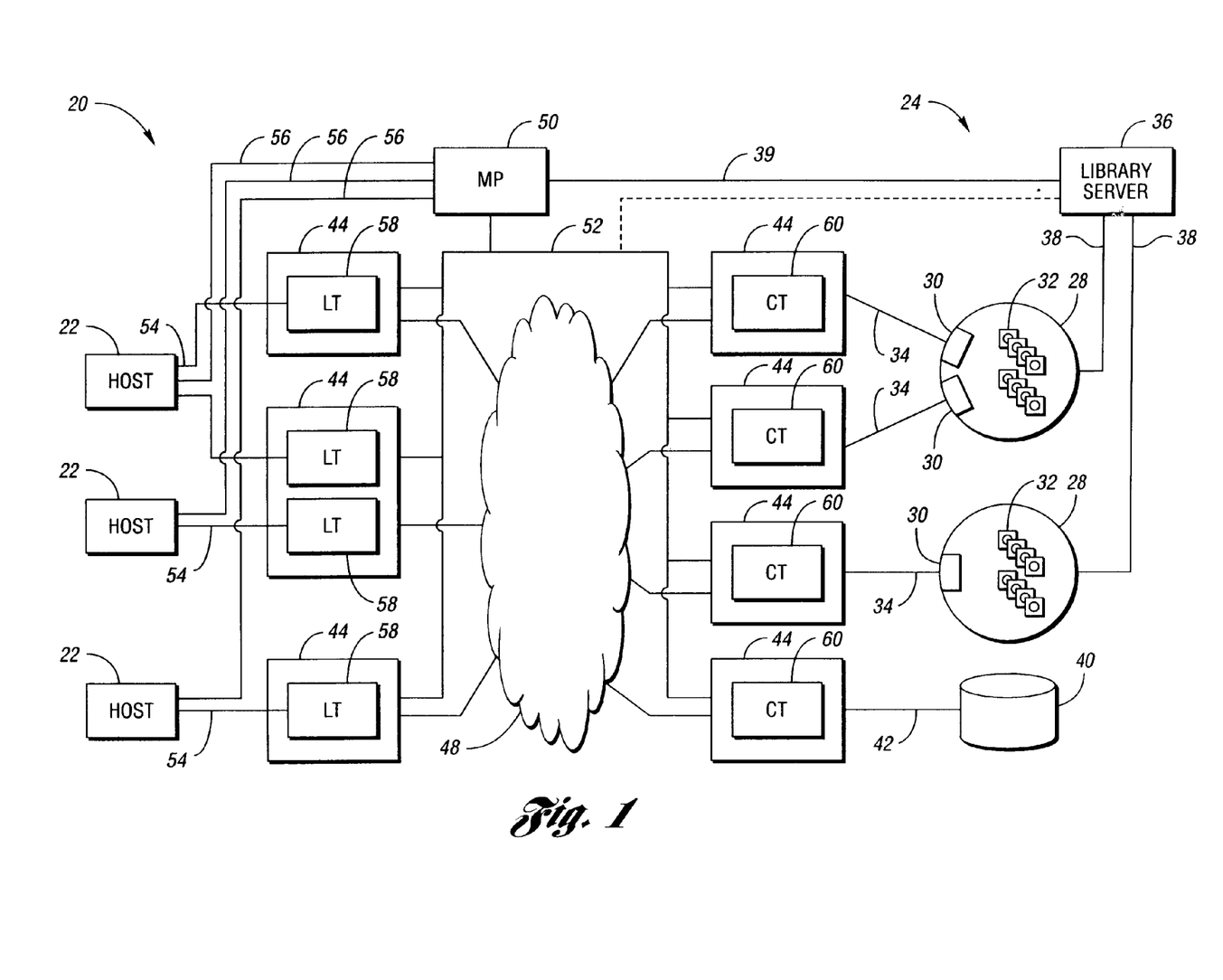
FIG. 1 is a block diagram illustrating virtual tape libraries in a computer system according to an embodiment of the present invention.

Referring to FIG. 1, a block diagram illustrating virtual tape libraries in a computer according to an embodiment of the present invention is shown. A computer system, shown generally by 20, includes a plurality of host computers 22 interconnected to a storage system, shown generally by 24, through a storage area network, shown generally by 26. Storage system 24 includes at least one tape library 28. Each tape library 28 has one or more tape drives 30 for accessing magnetic tape 32. Tape 32 is typically housed in a cassette or cartridge which is loaded into tape drive 30 by an automated mechanism not shown. Data to be written to tape 32 or read from tape 32 is accessed through tape channel or tape link 34. For simplicity, each tape drive 30 will be associated with one tape link 34. However, as will be recognized by one of ordinary skill in the art, each tape link 34 may support multiple tape drives 30. Storage system 24 also includes library server 36 connected by library links 38 to each tape library 28. Library server 36 supervises storage system 24, performing functions such as tracking which tape volumes are on each tape 32, tracking which tapes 32 are in each tape library 28, managing blank tapes 32, controlling mechanisms for loading tapes 32 into and unloading tapes 32 from-tape drives 30, controlling transport mechanisms for moving tapes 32 between tape libraries 28, managing archiving of tapes 32, and the like. Storage system 24 may also include one or more disks 40 written to or read from through disk link 42. Library server 36 receives instructions and returns status through server link 39.

Storage area network 26 includes a plurality of interface devices 44. Each interface device 44 may be a processor, a printed circuit card, or a standalone unit. Each interface device 44 is connected through data link 46 to data interconnect 48. Data interconnect 48 can form a high speed connection between two or more interface devices 44. Data interconnect 48 may be implemented using one or more backplanes, crossbar switches, ATM switches, fiber channel rings, Ethernet networks, and the like. Storage area network 26 also includes management processor 50 connected to each interface device 44 through network 52. An example storage area network 76 that may be used to implement the present invention is described in U.S. patent application entitled "Information Network Virtual Backplane" Ser. No. 09/688,784 by R. Lane et al., which hereby incorporated by reference.

Each host 22 connects to at least one interface device 44 through computer link 54. Each host 22 is also in communication with management processor 50. This communication may be through interface devices 44 and network 52, may be through a computer network linking host 22 and management processor 50, or may be through command links 56. If directly connected to management processor 50, each host 22 may have command link 56 or one master host 22 may have command link 56 to management processor 50 with remaining hosts 22 connected as slaves to host computer 22. Library server 36 is also connected to management processor 50. This connection may be through server link 39 directly connected to management processor 50 or may be through network 52.

Storage area network 26 maps logical tape access requests received from each host computer 22 into physical tape access requests for each tape library 28 and library server 36. To accomplish this mapping, each host 22 is associated with at least one logical tape module 58, each logical tape module 58 executing on interface device 44. Logical tape module 58 appears to host 22 to be tape drive 30 connected to host 22 by computer link 54. Likewise, each tape library 28 is associated with at least one canonical tape module 60 executing on interface device 44. Preferably, each tape drive 30 communicates with corresponding canonical tape module 60 through tape link 34. Management processor 50 maps each logical tape module 58 to at least one canonical tape module 60 capable of responding to tape volume access requests.

Figure 2:
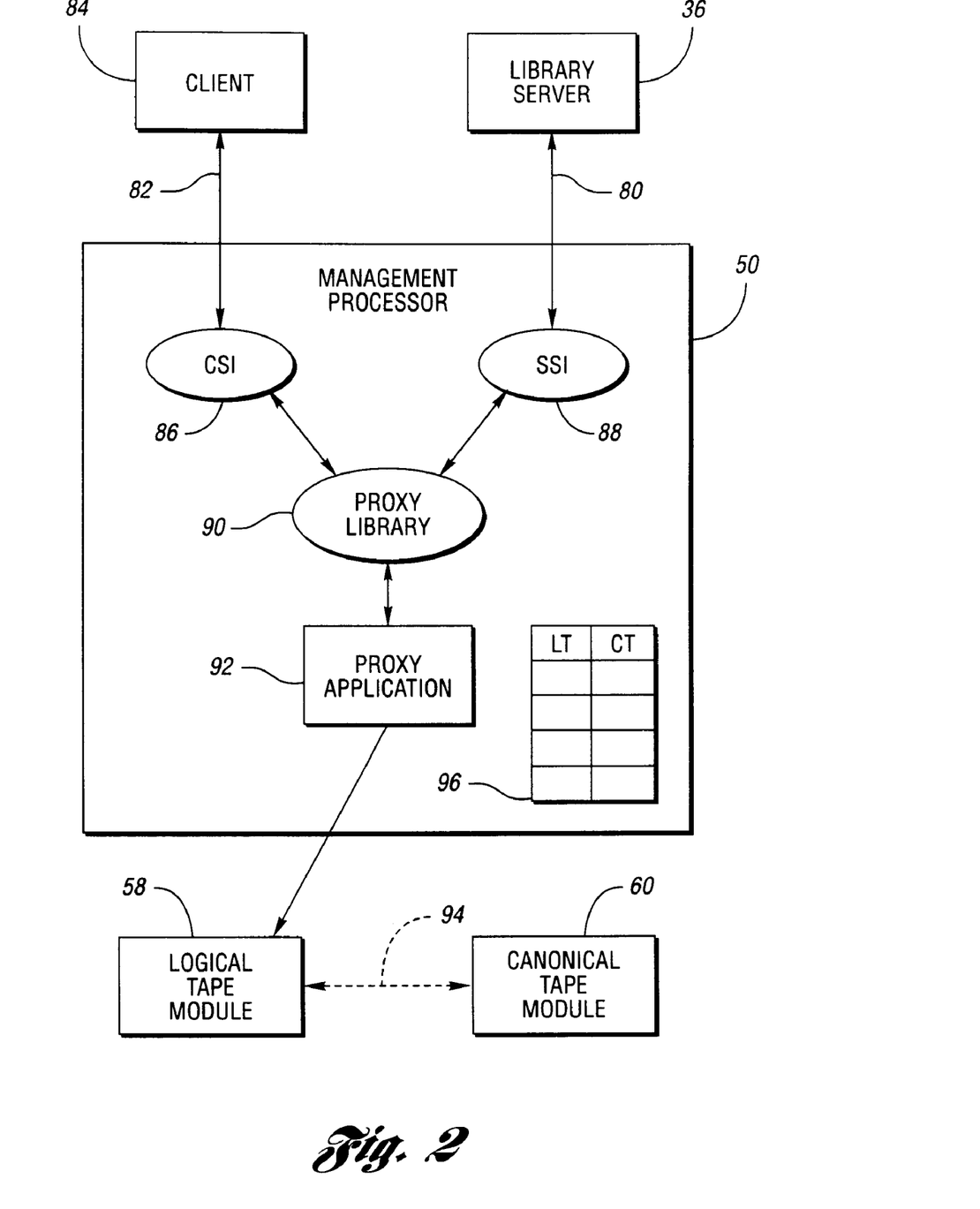
FIG. 2 is a block diagram illustrating a management processor according to an embodiment of the present invention.

Referring now to FIG. 2, a block diagram illustrating a management processor according to an embodiment of the present invention is shown. Management processor 50 exchanges server messages 80 with library server 36 and client messages 82 with client 84. Client 84 typically resides on host computer 22. However, any type of computer element may host client 84 and exchange data with tape library 28, including other tape libraries 28, disks 40, I/O processors, communication interfaces, data formatters, movers, translators, and the like.

Management processor 50 includes client-side interface 86 exchanging client messages 82 with clients 84. Client-side interface 86 presents a logical library server to client 84. There may be one client-side interface 86 for each client 84, one client-side interface 86 for each type of client 84, or one client-side interface 86 for all clients 84. Server-side interface 88 exchanges server messages 80 with library server 36. Both client-side interface 86 and server-side interface may provide translation and formatting functions, permitting different types of clients 84 and library servers 36 to be easily interconnected.

Proxy library 90 in management processor 50 provides an interface between client-side interface 86 and server-side interface 88. Proxy library 90 also accesses routines for servicing tape access requests. These routines are grouped in proxy application 92. One function of proxy application 92 is to maintain mappings between each logical tape module 58 and corresponding canonical tape module 60, one of which is indicated by 94. Mappings 94 may be maintained by proxy application 92 in mapping table 96.

Figure 3:
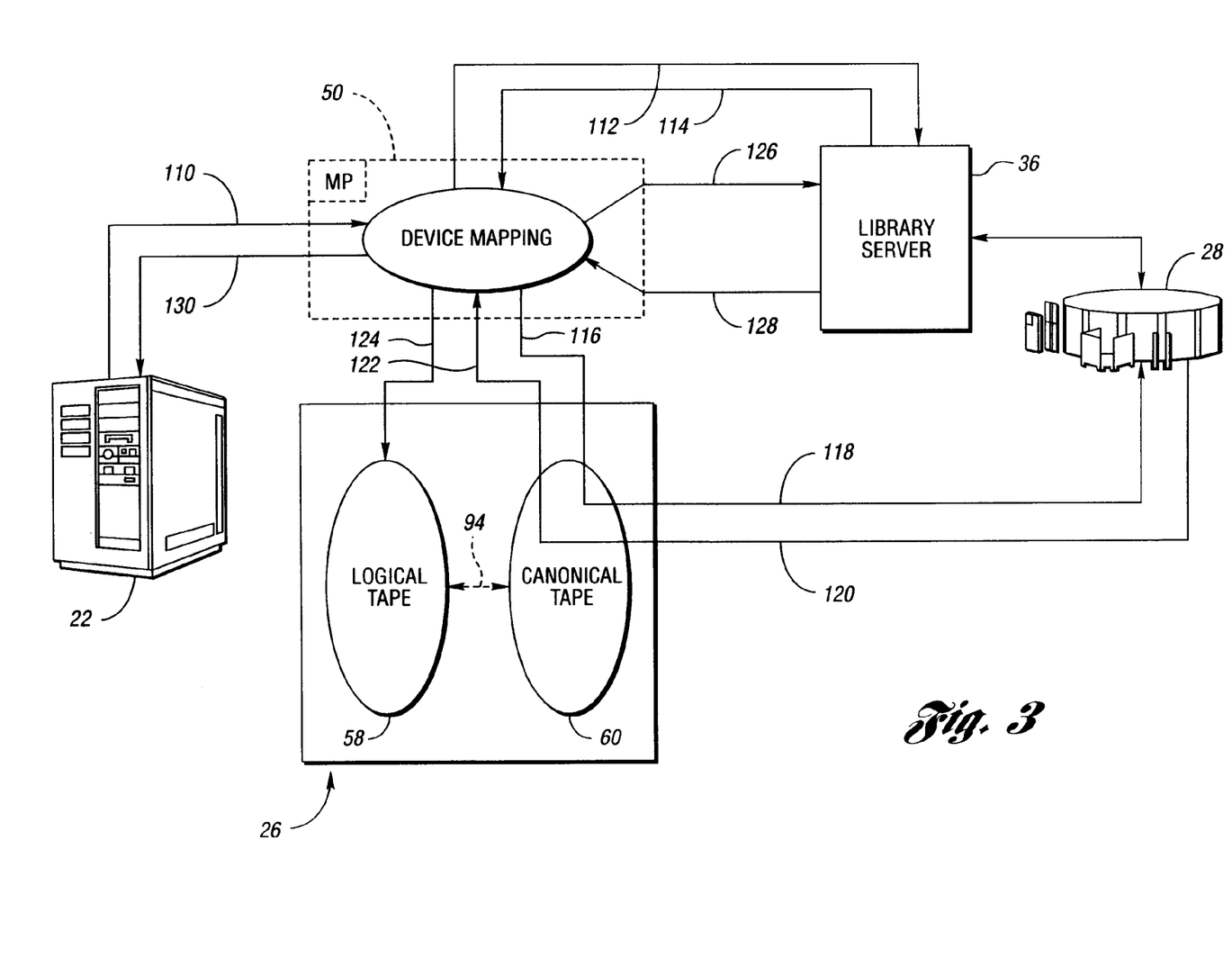
FIG. 3 is a schematic diagram illustrating mapping according to an embodiment of the present invention.

Referring now to FIG. 3, a schematic diagram illustrating mapping according to an embodiment of the present invention is shown. Host computer 22 sends logical mount request 110 specifying a tape volume to be accessed through logical tape module 58 to management processor 50. Management processor 50 forwards the tape volume in mount query 112 to library server 36. Library 36 replies with mount query response 114 including a list of tape drives 30 or corresponding canonical tape modules 60 which can access the requested tape volume. Preferably, this list ranks canonical tape modules 60 from most optimal to least optimal for the tape access request. For example, tape drives 30 in tape library 28 containing tape 32 on which the requested tape volume is recorded will receive a higher ranking than drive 30 in tape library 28 that does not contain the requested tape volume. Ranking may also be based on availability of tape drives 30, estimated time to load tape 32 containing the requested volume, access speed of drives 30, availability of multiple copies of the requested tape volume, and the like. If more than one canonical tape module 60 is specified in mount query response 114, management processor 50 decides which canonical tape module 60 to use based on the ranking supplied in mount query response 114 and the availabilities of listed canonical tape modules 60.

Management processor 50 sends canonical drive reserve request 116 to the selected canonical tape module 60, which forwards the request in physical drive reserve request 118 to the appropriate tape drive 30. Tape drive 30 replies with physical drive reserve response 120 which is forwarded by canonical tape module 60 as canonical drive reserve response 122. Management processor 50 records the mapping of logical tape module 58 specified in logical mount request 110 and selected canonical tape module 60. This mapping is forwarded to logical tape module 58 in map message 124. Management processor 50 also sends physical mount request 126 to library server 36 to mount the specified volume. Once the tape volume is mounted in drive 30, library server 36 replies to management processor 50 with physical mount response 128. Host 22 is notified that the requested volume is mounted through logical mount response 130. Following successful completion of this process, host 22 may access the requested tape volume as if this volume was actually mounted on logical tape module 58. Hence, host 22 is presented with a virtual tape library consisting of all physical tape libraries 28 and associated tape drives 30 each accessible through logical tape module 58.

Figure 4:
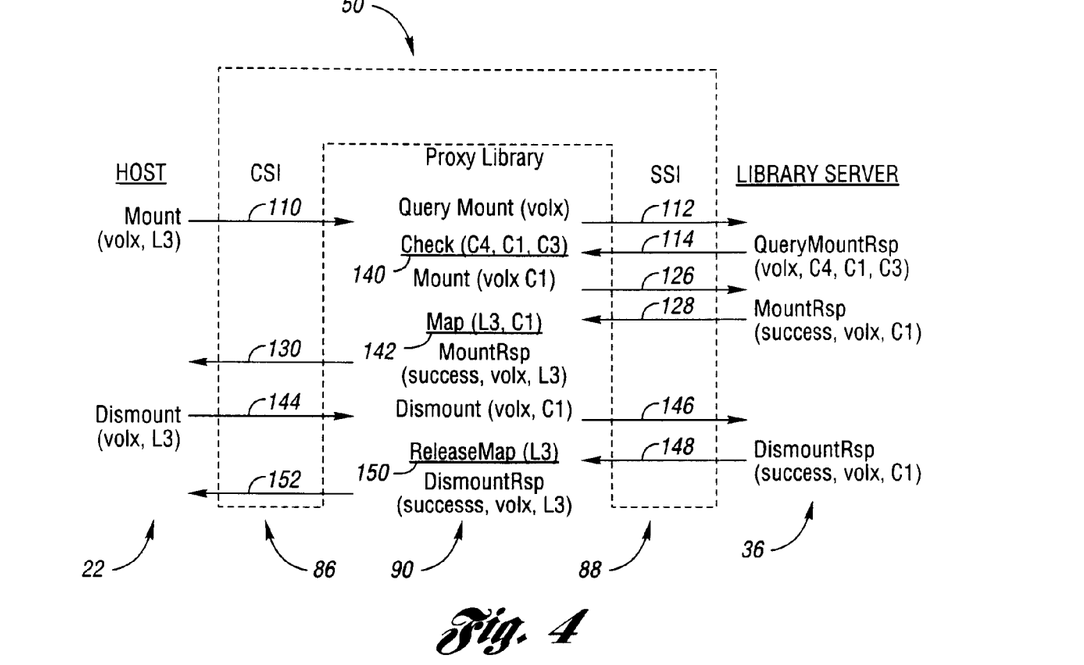
FIG. 4 is a call flow diagram illustrating tape volume mounting and dismounting according to an embodiment of the present invention.

Referring now to FIG. 4, a call flow diagram illustrating tape volume mounting and dismounting according to an embodiment of the present invention is shown. Proxy library 90 receives logical mount request 110 through client-side interface 86 from host 22 specifying a requested tape volume (volx) and logical tape module 58 (L3). Proxy library 90 forwards the requested tape volume in mount query 112 through server-side interface 88 to library server 36. In mount query response 114, library server 36 indicates that volx may be mounted on one of three canonical tape modules 60, indicated as C4, C1, C3 in descending order of access optimization. Proxy library 90 then places check call 140 to proxy application 92 including the identifiers for the returned canonical tape modules 60. Proxy application 92, in this example, determines that canonical tape module 60 indicated by C4 is not available but canonical tape module 60 indicated by C1 is available. Proxy application 92 then sends canonical tape module 60 indicated by C1 canonical drive reserve request 116. After receiving canonical drive reserve response 122, proxy application 92 notifies proxy library 90 of the successful mapping of L3 to C1. Proxy library 90 then sends physical mount request 126 indicating that volx is to be mounted on tape drive 30 corresponding to C1 to library server 36. Library server 36 responds with physical mount response 128 indicating the success of mounting volx on C1. Proxy library 90 makes map call 142 directing proxy application 92 to record the mapping of L3 to C1 in mapping table 96. Map message 124 may be sent to logical tape module 58 at this time. Proxy library 90 then sends logical mount response 130 indicating the success of mounting volx on L3 to host 22.

When host 22 is finished accessing volx, host 22 sends logical dismount request 144 specifying volx and L3 to proxy library 90. Proxy library 90 maps L3 to C1 through proxy application 92 and sends physical dismount request 146 containing volx and C1 to library server 36. Library server 36 replies with physical dismount response 148. Proxy library 90 places release map call 150 specifying L3 to proxy application 92. Proxy application 92 clears the entry for L3 in mapping table 96 and notifies logical tape module 58 indicated by L3 that mapping 94 is terminated. Proxy library 90 then sends logical dismount response 152 indicating the success of the dismount operation to host 22.

Figure 5:
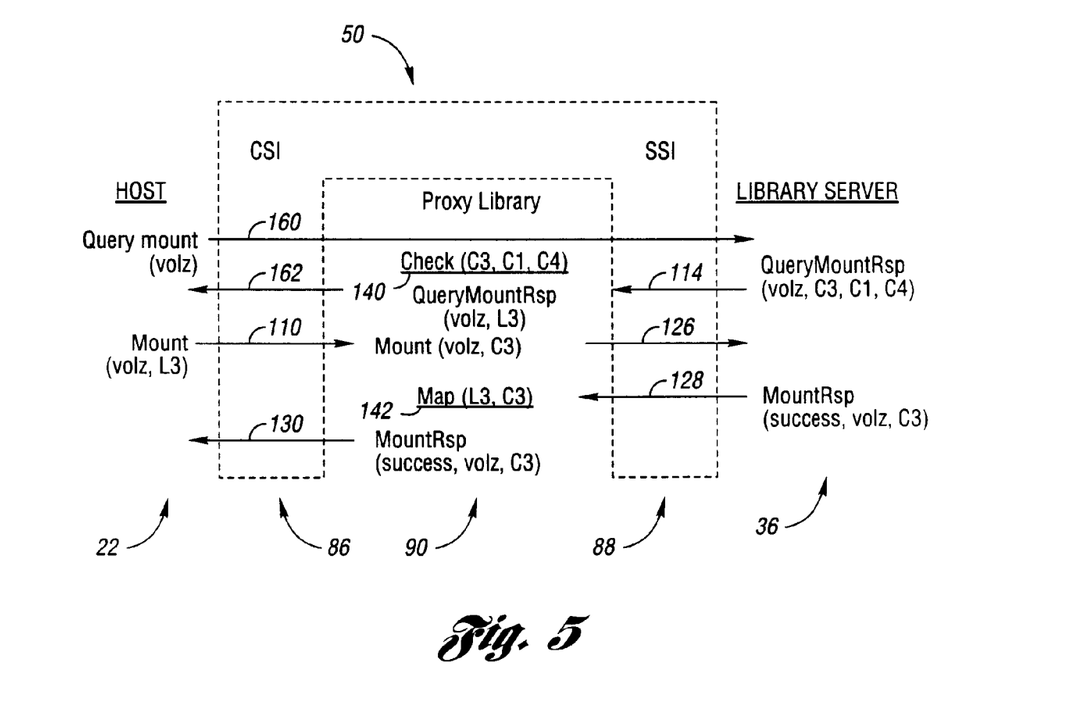
FIG. 5 is a call flow diagram illustrating tape volume query and mounting according to an embodiment of the present invention.

Referring now to FIG. 5, a call flow diagram illustrating tape volume query and mounting according to an embodiment of the present invention is shown. Host 22 may treat management processor 50 as a logical version of library server 36. For example, host 22 may initiate a mounting of tape volume volz by issuing logical mount query 160 to management processor 50. After passing through client-side interface 86, query mount 160 is sent by proxy library 90 directly to server-side interface 88. After any necessary formatting changes are made, logical mount query 160 is forwarded to library server 36. Library server 36 replies with mount query response 114 including a ranked listing of indicators for canonical tape module 60 capable of servicing the request for tape volume volz. Proxy library 90 places check call 140 to proxy application 92. Proxy application 92 responds with an indication that canonical tape module 60 indicated C3 will handle the access request. Proxy library 90 then uses information about host 22 and logical tape modules 58 to select logical tape module 58 indicated L3 to serve as the logical interface for data accessed on volz. Proxy library 90 sends logical mount query response 162 specifying volz and L3 to host 22. Host 22 then issues logical mount request 110 to proxy library 90. Proxy library 90 replaces logical tape module 58 indicator L3 with mapped canonical tape module 60 indicator C3 and issues physical mount request 126. After receiving physical mount response 128, proxy library 90 issues map call 142 followed by logical mount response 130.

Figure 6:
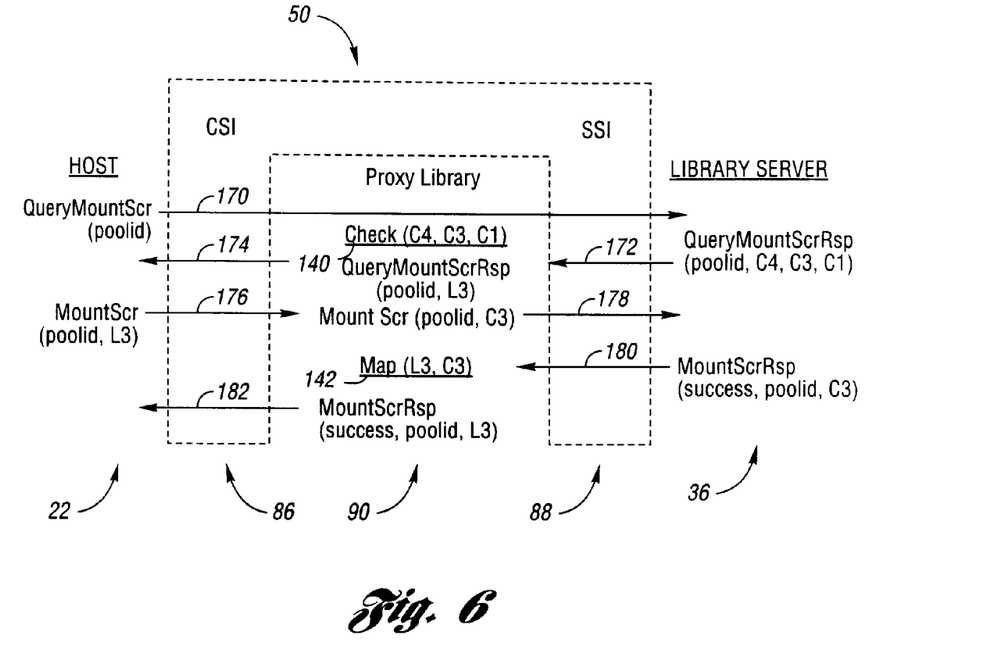
FIG. 6 is a call flow diagram illustrating scratch volume mounting according to an embodiment of the present invention.

Referring now to FIG. 6, a call flow diagram illustrating scratch volume mounting according to an embodiment of the present invention is shown. Host 22 may request a blank or scratch volume specified by a pool identifier (poolid) in logical scratch mount query 170. Proxy library 90 receives logical scratch mount query 170 through client-side interface 86 and forwards logical scratch mount query 170 to library server 36 through server-side interface 88. Server-side interface 88 may perform any formatting changes necessary to convert logical scratch mount query 170 into a format acceptable by library server 36. Library server 36 replies with physical scratch query response 172 containing a ranked listing of indicators for canonical tape module 60 capable of accessing scratch volume poolid. Proxy library 90 places check call 140 to determine which canonical tape module 60 will be used. Proxy library 90 also determines an appropriate logical tape module 58, indicated by L3, to interface with host 22. Proxy library 90 sends logical scratch query response 174 containing poolid and L3 to host 22. Host 22 then issues physical scratch mount request 178 to mount scratch volume poolid onto logical drive L3. Proxy library 90 replaces logical tape module 58 reference L3 with canonical tape module 60 reference C3 and forwards physical scratch mount request 178 to library server 36. After receiving physical scratch mount response 180 from library server 36, proxy library 90 places map call 142 with proxy application 92. Proxy library 90 then sends logical scratch mount response indicating the success of the scratch volume mount operation to host 22.

Figure 7:
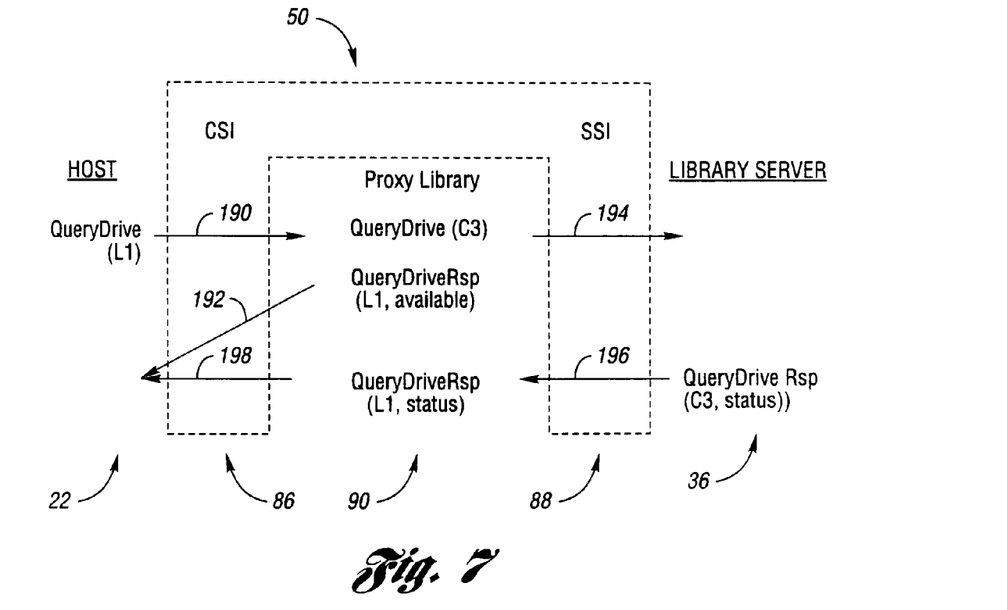
FIG. 7 is a call flow diagram illustrating logical drive query according to an embodiment of the present invention.

Referring now to FIG. 7, a call flow diagram illustrating logical drive query according to an embodiment of the present invention is shown. Host 22 may find the status of logical tape module 58, indicated L1, by issuing logical drive query 190 to proxy library 90. Proxy library 90 determines if L1 is in mapping table 96 by accessing proxy application 92. If L1 is not entered into mapping table 96, proxy library 90 responds with logical drive query response 192 indicating that LI is available. If L1 is in mapping table 96, for example mapped to canonical tape module 60 indicated by C3, proxy library 90 sends C3 in physical drive query 194 to library server 36. Library server 36 replies with physical drive query response 196 containing the status of C3. Proxy library forwards the status of C3 together with L1 to host 22 in logical drive query response 198.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A storage area network implementing virtual tape libraries comprising:
    a plurality of logical tape modules, each logical tape module presenting a logical tape drive to a computer element communicating with the logical tape module;
    a plurality of canonical tape modules, each canonical tape module communicating with a physical tape drive;
    a data interconnect connecting the logical tape modules with the canonical tape modules; and
    a management processor in communication with the canonical tape modules and the logical tape modules, the management processor mapping each logical tape module requested by a computer element into at least one canonical tape module.

2. A storage area network implementing virtual tape libraries as in claim 1 wherein the management processor is further operative to receive requests to access logical tape modules from computer elements and to forward corresponding requests to access canonical tape modules to a tape library server.

3. A storage area network implementing virtual tape libraries as in claim 2 wherein the management processor comprises:
    a proxy library having routines for servicing tape access requests;
    a client-side interface in communication with the computer elements, the client-side interface operative to execute tape access request service routines based on the logical tape access requests received from the computer elements; and
    a server-side interface in communication with the library server and the client-side interface, the server-side interface operative to generate library server commands based on the results of executed tape access request service routines.

4. A storage area network implementing virtual tape libraries as in claim 3 wherein the client-side interface exchanges information with at least one computer element through a first set of commands and wherein the server-side interface exchanges information with the library server through a second set of commands.

5. A system implementing virtual tape libraries accessible by at least one host computer, each host computer having at least one computer link for writing data to and reading data from storage, the system comprising:
    at least one tape library, each tape library operative to access a plurality of tapes, each tape library having at least one tape link carrying data written to or read from the tapes;
    a library server in communication with the at least one tape library, the library server generating tape access commands for each-tape library; and
    a storage area network interfacing the at least one host computer, the at least one tape library, and the library server, the storage area network mapping logical tape access requests from each host computer into physical tape access requests for each tape library and the library server, the storage area network including at least one logical tape module for each host computer, each logical tape module operative to receive requests to access data on a tape volume, and at least one canonical tape module for each tape library, each canonical tape module operative to respond to requests to access data on the tape volume.

6. A system implementing virtual tape libraries as in claim 5 wherein the storage area network comprises a management processor in communication with the at least one logical tape module and the at least one canonical tape module, the management processor mapping each logical tape module to the at least one canonical tape module operative to respond to tape volume access requests.

7. A system implementing virtual tape libraries as in claim 6 wherein the management processor is in communication with each host computer and the library server, the management processor operative to map requests to access a logical tape module into requests to access a physical tape module.

8. A system implementing virtual tape libraries as in claim 7 wherein the management processor comprises:
  a proxy library accessing routines for servicing tape access requests;
  a client-side interface in communication with the at least one host computer, the client-side interface operative to execute tape access request service routines based on tape access requests received from the at least one host computer; and
  a server-side interface in communication with the library server and the client-side interface, the server-side interface operative to generate library server commands based on the results of executed tape access request service routines.

9. A system implementing virtual tape libraries as in claim 8 wherein the client-side interface exchanges information with the at least one host computer through a first set of commands and wherein the server-side interface exchanges information with the library server through a second set of commands.

10. A system implementing virtual tape libraries accessible by at least one host computer, each host computer having at least one computer link for writing data to and reading data from storage, the system comprising:
  at least one tape library, each tape library operative to access a plurality of tapes, each tape library having at least one tape link carrying data written to or read from the tapes;
  a library server in communication with the at least one tape library, the library server generating tape access commands for each tape library; and
  a storage area network interfacing the at least one host computer, the at least one tape library, and the library server, the storage area network mapping logical tape access requests from each host computer into physical tape access requests for each tape library and the library server, the storage area network including
    (a) a proxy library accessing routines for servicing tape access requests,
    (b) a client-side interface in communication with the at least one host computer, the client-side interface operative to execute tape access request service routines based on tape access requests received from the at least one host computer, and
    (c) a server-side interface in communication with the library server and the client-side interface, the server-side interface operative to generate library server commands based on the results of executed tape access request service routines.

11. A system implementing virtual tape libraries as in claim 10 wherein the client-side interface exchanges information with the at least one host computer through a first set of commands and wherein the server-side interface exchanges information with the library server through a second set of commands.

12. A storage area network implementing virtual tape libraries comprising:
  a plurality of logical tape modules, each logical tape module presenting a logical tape drive to a computer element communicating with the logical tape module;
  a plurality of canonical tape modules, each canonical tape module communicating with a physical tape drive;
  a data interconnect connecting the logical tape modules with the canonical tape modules;
  a client-side interface in communication with the computer elements, the client-side interface operative to execute tape access request service routines based on logical tape access requests received from the computer elements; and
  a server-side interface in communication with the library server and the client-side interface, the server-side interface operative to generate library server commands based on the results of executed tape access request service routines.

13. A storage area network implementing virtual tape libraries as in claim 12 wherein the client-side interface exchanges information with at least one computer element through a first set of commands and wherein the server-side interface exchanges information with the library server through a second set of commands.

14. A method of accessing data stored on magnetic tape comprising:
  receiving a request to access a tape volume;
  determining a tape drive operative to satisfy the tape access request;
  reserving the tape drive in a canonical tape module, the canonical tape module within a storage area network;
  mapping each request to access data on the tape volume to the canonical tape module in a logical tape module, the logical tape module within the storage area network; and
  forwarding each mapped data access request from the logical tape module to the canonical tape module.

15. A method of accessing information stored on magnetic tape as in claim 14 wherein receiving the request to access the tape volume comprises:
  receiving a request to mount the tape volume;
  sending a mount query to a tape library server; and
  receiving the mount query response from the tape library server.

16. A method of accessing information stored on magnetic tape as in claim 15 wherein determining the tape drive satisfying the tape access request comprises:
  receiving a plurality of canonical tape module identifiers in the mount query response, each canonical tape module identifier identifying a tape drive capable of satisfying the tape access request; and
  selecting one canonical tape module identifier from the plurality of canonical tape module identifiers corresponding to the tape drive optimizing the tape access request.

17. A method of accessing information stored on magnetic tape as in claim 14 wherein reserving the tape drive in the canonical tape module comprises:
  receiving in the canonical tape module a request to reserve the tape drive;
  sending a request to reserve the tape drive to a tape library containing the tape drive;

receiving a response indicating that the tape drive is reserved; and notifying a management processor of the received response.

18. A method of accessing information stored on magnetic tape as in claim 14 further comprising:

determining a mapping between each logical tape module and the corresponding canonical tape module in a management processor; and sending the mapping to the logical tape module.

19. A method of presenting virtual tape libraries to at least one host computer comprising:

connecting each host computer to at least one logical tape module within a storage area network, each logical tape module presenting a logical tape drive interface;

connecting each tape library to at least one canonical tape module within the storage area network, each canonical tape module interconnected with each logical tape module through an interconnection network;

receiving a request to access a tape volume from a host computer, the request specifying a logical tape module; and mapping the specified logical tape module to a canonical tape module operative to access the requested tape volume.

20. A method of presenting virtual tape libraries to at least one host computer as in claim 19 wherein mapping the specified logical tape module to the canonical tape module comprises querying a tape library server to determine which canonical tape modules are operative to access the requested tape volume.

21. A method of presenting virtual tape libraries to at least one host computer as in claim 20 further comprising selecting the canonical tape module optimizing the tape volume access request.

22. A method of presenting virtual tape libraries to at least one host computer as in claim 19 wherein the request to access the tape volume is received in a management processor operative to query a tape library server to determine at least one canonical tape module operative to access the requested tape volume.

* * * * *